UNITED STATES PATENT OFFICE.

RICHARD CHARLES BAKER, OF LONDON, ENGLAND.

PROCESS OF OBTAINING HARDENING OR TOUGHENING COMPOUNDS FOR ALLOYING WITH IRON OR STEEL.

SPECIFICATION forming part of Letters Patent No. 652,877, dated July 3, 1900.

Application filed February 24, 1900. Serial No. 6,361. (No specimens.)

*To all whom it may concern:*

Be it known that I, RICHARD CHARLES BAKER, a subject of the Queen of Great Britain and Ireland, and a resident of London, England, have invented new and useful Improvements in the Obtainment of Hardening or Toughening Compounds for Alloying with Steel or other Metals; and I do hereby declare the following to be a full, clear, and exact description of the same.

This invention relates to improvements in the obtainment of hardening or toughening compounds for alloying with steel and other metals; and it consists in a process whereby ferro-boron, nickel-boron, chromium-boron, or tungsten-boron are respectively produced simultaneously with calcium carbid as products of the reaction involved and whereby the difficulties incidental to the obtainment of borid compounds of such metals (hereinafter referred to as "hardening metals") are avoided and such respective borid and calcium compounds are simultaneously more economically and conveniently obtained than they can be by existing processes of producing such compounds separately.

To this end the invention is characterized by the reduction of calcium borate in the presence of iron or of such hardening metal of which the borid is required and of carbon or in the presence of suitable compounds of or containing such metal and carbon by heating such respective constituents or constituent compounds in an electrical furnace to a temperature sufficient to cause the deoxidation of the calcium borate and to bring about the combination of its boron and calcium constituents with the iron or such hardening metal and carbon constituents, respectively, with the simultaneous production of the required iron or such hardening metal borid and calcium carbid, the borid compound being obtained in a fused mass upon which the calcium carbid will rest in the furnace in a less dense mass. The borid compound may be run off from the furnace into ingot-molds, leaving the calcium carbid for subsequent removal, or the two compounds, if obtained together, will readily separate or may be readily separated.

What I claim as my invention, and desire to secure by Letters Patent, is—

1. The process of obtaining simultaneously calcium carbid and the borid of a metal capable of use as a hardening or toughening agent, which consists in subjecting a mixture of calcium borate, carbon and a material containing such metal to heat sufficient to effect the reaction.

2. The process of obtaining simultaneously calcium carbid and the borid of a metal capable of use as a hardening or toughening agent, which consists in subjecting a mixture of calcium borate, carbon and such metal to heat sufficient to effect the reaction.

In testimony whereof I have signed this specification in the presence of two subscribing witnesses.

RICHARD CHARLES BAKER.

Witnesses:
CHARLES AUBREY DAY,
T. J. OSMAN.